(12) United States Patent
Liewald et al.

(10) Patent No.: US 11,466,985 B2
(45) Date of Patent: Oct. 11, 2022

(54) ROTATION-RATE SENSOR, METHOD FOR PRODUCING A ROTATION-RATE SENSOR

(71) Applicant: Robert Bosch GmbH, Stuttgart (DE)

(72) Inventors: Jan-Timo Liewald, Kusterdingen (DE); Andreas Lassl, Korntal-Muenchingen (DE); Burkhard Kuhlmann, Reutlingen (DE); Matthias Kuehnel, Boeblingen (DE); Niels Bode, Stuttgart (DE); Nils Felix Kuhlmann, Ehningen (DE); Odd-Axel Pruetz, Nuertingen (DE); Peter Degenfeld-Schonburg, Renningen (DE); Reinhard Neul, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 48 days.

(21) Appl. No.: 16/636,798

(22) PCT Filed: Jul. 30, 2018

(86) PCT No.: PCT/EP2018/070567
§ 371 (c)(1),
(2) Date: Feb. 5, 2020

(87) PCT Pub. No.: WO2019/030036
PCT Pub. Date: Feb. 14, 2019

(65) Prior Publication Data
US 2020/0378761 A1 Dec. 3, 2020

(30) Foreign Application Priority Data

Aug. 8, 2017 (DE) ...................... 10 2017 2137 80.0

(51) Int. Cl.
*G01C 19/5705* (2012.01)
*G01C 19/5747* (2012.01)
(Continued)

(52) U.S. Cl.
CPC ...... *G01C 19/5705* (2013.01); *G01C 19/5733* (2013.01); *G01C 19/5747* (2013.01); *G01C 19/5783* (2013.01)

(58) Field of Classification Search
CPC ............ G01C 19/5705; G01C 19/5783; G01C 19/5733; G01C 19/5747; G01C 19/574; G01C 19/5719; G01C 19/5712
See application file for complete search history.

(56) References Cited

U.S. PATENT DOCUMENTS

| 6,119,517 A * | 9/2000 | Breng ................. G01C 19/574 73/504.12 |
| 2010/0107762 A1* | 5/2010 | Classen ............... G01P 15/0802 73/514.24 |

(Continued)

FOREIGN PATENT DOCUMENTS

| DE | 102010038461 A1 | 2/2012 |
| DE | 102013208817 A1 | 11/2014 |

(Continued)

OTHER PUBLICATIONS

International Search Report for PCT/EP2018/070567, dated Oct. 26, 2018.

*Primary Examiner* — Helen C Kwok
(74) *Attorney, Agent, or Firm* — Norton Rose Fulbright US LLP; Gerard Messina

(57) ABSTRACT

A rotation-rate sensor having a substrate, the substrate having a main-extension-plane, and the rotation-rate sensor includes at least one first and one second mass-element which are oscillate-able, and a first main-extension-direction of the substrate points from the first mass-element to the second mass-element, and a coupling-structure is situated in the first main-extension-direction between the first and second mass-element, in which a first coupling-region of the coupling-structure is situated in a first function-layer, and a (Continued)

first mass-region of the first mass-element is situated in the first function-layer and a second mass-region of the first mass-element is situated in a second function-layer, the first function-layer being situated in an extension-direction perpendicular to the main-extension-plane between the substrate and the second function-layer, a second main-extension-direction being situated perpendicular to the first main-extension-direction, and the first coupling-region having a greater extension in the first main-extension-direction than in the second main-extension-direction.

14 Claims, 13 Drawing Sheets

(51) Int. Cl.
    *G01C 19/5783*     (2012.01)
    *G01C 19/5733*     (2012.01)

(56) References Cited

U.S. PATENT DOCUMENTS

| | | | | |
|---|---|---|---|---|
| 2010/0175473 A1* | 7/2010 | Classen | ............... | G01P 15/125 73/514.29 |
| 2010/0186507 A1* | 7/2010 | Gunthner | ............. | G01C 19/574 73/504.14 |
| 2012/0024059 A1 | 2/2012 | Classen | | |
| 2013/0186200 A1* | 7/2013 | Classen | ............. | G01C 19/5747 73/504.12 |
| 2013/0340522 A1* | 12/2013 | Kuhlmann | ......... | G01C 19/5747 73/504.12 |
| 2014/0183669 A1* | 7/2014 | Xu | ........................ | B81B 3/0021 257/415 |
| 2014/0373627 A1* | 12/2014 | Pruetz | .................. | G01C 19/574 73/504.12 |
| 2016/0069682 A1* | 3/2016 | Balslink | ............ | G01C 19/5705 73/504.12 |

FOREIGN PATENT DOCUMENTS

| | | |
|---|---|---|
| DE | 102013212056 A1 | 1/2015 |
| DE | 102014226739 A1 | 6/2016 |
| EP | 0973010 A2 | 1/2000 |
| JP | 2010261741 A | 11/2010 |
| JP | 2011112455 A | 6/2011 |
| JP | 2015203583 A | 11/2015 |
| JP | 2016176835 A | 10/2016 |
| KR | 20160000772 A | 1/2016 |
| WO | 2011119930 A1 | 9/2011 |

* cited by examiner

ROTATION-RATE SENSOR, METHOD FOR PRODUCING A ROTATION-RATE SENSOR

FIELD OF THE INVENTION

The present invention is based on a rotation-rate sensor.

BACKGROUND INFORMATION

Rotation-rate sensors on substrates are generally believed to be understood. They involve special micromechanical systems (MEMS), usually on a silicon basis, by which rates of rotation can be measured. The rotation-rate sensors typically have different mass bodies. Such mass bodies are used as detection masses, drive masses and/or Coriolis masses. Toward this end, the individual masses are coupled to one another and partially to the substrate. The masses and springs in the case of in-plane rotation-rate sensors are frequently configured in a function layer. However, the spring elements are typically restricted to bending and torsion elements which generally have only a limited number of configuration options and only limited possibilities for coupling masses and for enabling/suppressing certain relative oscillation directions and modes.

SUMMARY OF THE INVENTION

It is an object of the present invention to provide a rotation-rate sensor having a substrate for which improved and/or expanded possibilities for coupling different masses are provided, for instance in such a way that movements of the masses in the main extension plane of the substrate are able to be generally or selectively suppressed while movements perpendicular thereto are enabled.

In contrast to the related art, the rotation-rate of the present invention as described herein has the advantage that through the use of a first and second function layer and the placement of mass regions of a first mass element in both function layers, there are advantageous possibilities for generating a desired oscillation characteristic of the two mass elements. In particular, it is possible according to the present invention to configure the coupling structure entirely or partially in a first function layer. For example, this advantageously results in the possibility of realizing spring elements which are configured to be stiff in the first main extension direction, in particular, and permit movements of mass elements perpendicular to the main extension plane, e.g., tilting movements and/or rotary movements.

Another subject matter of the present invention is a rotation-rate sensor having a substrate, the substrate having a main extension plane, and the rotation-rate sensor includes at least one first and one second mass element able to be made to oscillate, a first main extension direction of the substrate pointing from the first mass element to the second mass element, and a coupling structure is situated in the first main extension direction between the first and the second mass element, characterized in that a first coupling region of the coupling structure is situated in a first function layer, a first mass region of the first mass element is situated in the first function layer and a second mass region of the first mass element is situated in a second function layer, the first function layer being situated in an extension direction perpendicular to the main extension plane between the substrate and the second function layer.

Advantageous embodiments and further developments of the present invention may be gathered from the further embodiments as well as the description with reference to the drawings.

Because the first function layer according to the present invention has a smaller extension than the second function layer in the extension direction perpendicular to the main extension plane, it is advantageously possible that the first coupling region and/or the entire coupling structure allow(s) movements of mass elements perpendicular to the main extension plane, e.g., tilting movements and/or rotary movements.

Because the first coupling region has greater stiffness in the first main extension direction than in the second main extension direction, it is possible according to one embodiment of the present invention that a first coupling region is provided which has a less stiff development both in the extension direction perpendicular to the main extension plane of the substrate and in the second main extension direction of the substrate than in the first main extension direction. In this way, it possible to realize a coupling structure with whose aid mass elements may be coupled in such a way that they are able to move relative to one another in the second main extension direction and in the extension direction (perpendicular to the main extension plane of the substrate), but are rigidly coupled in the first main extension direction.

Because a third function layer is situated in the extension direction between the substrate and the first function layer according to one embodiment of the present invention, a third mass region of the first mass element being situated in the third function layer, it is possible to realize coupled mass elements that do not execute a dominant compensatory movement in the main extension plane of the substrate when subjected to stress. In particular, it is possible that an assembly of first mass element, second mass element and coupling structure is configured symmetrically (in relation to a symmetry plane which extends in the extension direction perpendicular to the main extension plane of the substrate and in the first main extension direction). This is possible in particular when a further, first mass region of the second mass element is situated in the first function layer, a further second mass region of the second mass element being situated in the second function layer and, in particular, a further third mass region of the second mass element is situated in the third function layer. More specifically, it is possible according to the embodiment of the present invention that bending of the connected (first and second) mass elements in the positive extension direction (perpendicular to the main extension plane) and in the negative extension direction essentially takes place symmetrically.

This is possible in particular if the force introduction defined via the hinge springs in a deflection of the masses takes place in a centered manner (in relation to the extension of the mass in the extension direction) because the coupling structure (e.g., the hinge springs) is connectable to the mass elements in a centered manner. As a consequence, it is possible that a force impressed in the main extension plane does not lead to an evasive movement of the coupling structure in the negative or positive extension direction (perpendicular to the main extension plane). This may have an advantageous effect on the behavior of the rotation-rate sensor.

According to one embodiment of the present invention, it is possible to provide further function layers (or structure planes). The expansion to a plurality of structure planes allows for a centered placement (in relation to the extension direction) of the coupling structures (e.g., the hinge springs, push rods and/or push bands). In particular in the case of three function layers or some other odd number of function layers, micromechanical coupling structures that are intrinsically symmetrical as well as coupling structures fixed in place on the mass elements in a symmetrical manner are advantageously possible.

Since a second coupling region of the coupling structure is situated in the second function layer according to one embodiment of the present invention, it is possible to realize different advantageous cross-sectional areas (perpendicular to the first main extension direction) for the coupling structure. For example, it is possible to realize L-, T- or U-shaped cross-sectional areas.

It is may be provided according to the present invention to place a third coupling region of the coupling structure in the third function layer. This makes it possible to configure rocker structures having particularly advantageous characteristics. For example, coupling structures which have a cross-shaped cross-section are able to be realized. Such cross-sections lead to greater symmetry of the coupling structure/the torsion element with regard to the torsion axis, for example, and they also minimize asymmetrical stiffnesses with regard to (undesired) bending movements in the main extension plane of the substrate and the extension direction perpendicular thereto.

Since according to an embodiment of the present invention a fourth function layer is situated in the extension direction above the second function layer, and a further second mass element is situated in the fourth function layer, the coupling structure having a second coupling region disposed in the second function layer and a further coupling region, the further coupling region being situated in the fourth function layer, and the first mass element and the further second mass element are mechanically connected to each other with the aid of the coupling structure, it is possible to couple mass elements in different function layers to one another in an advantageous manner. For example, the further second mass element may be at least partially situated above the second mass element.

Since a further first mass element is situated in the fourth function layer according to an embodiment of the present invention, and an additional coupling structure is situated in the first main extension direction between the first and second mass elements, the additional coupling structure having an additional coupling region and an additional further coupling region, the additional coupling region being configured in the first and the second function layer and the additional further coupling region being configured in the fourth function layer, the second mass element and the further first mass element being mechanically connected to each other with the aid of the additional coupling structure, it is the third function layer which advantageously mass elements that are situated on top of one another in each case have a crossed coupling, in particular if the further first mass element is at least partially situated above the first mass element.

Since the coupling structure has at least one anchoring point, and which may be two anchoring points, on the substrate according to one embodiment of the present invention, in particular such that the coupling structure includes a hinged element, it is advantageously possible to configure the coupling structure in the form of a hinge. This makes it possible to suppress undesired bending movements. In addition or as an alternative, it is possible to configure the coupling structure as a rocker structure.

Overall, because of the use of multiple function layers, the present invention makes it possible to realize coupled mass elements having a variety of desired (coupled) oscillation characteristics.

In comparison to the related art, the method for producing a rotation-rate sensor of the present invention according to one embodiment of the present invention offers the advantages already described in the previous text in connection with the rotation-rate sensor according to the present invention or an embodiment of the rotation-rate sensor according to the present invention.

Exemplary embodiments of the present invention are illustrated in the drawing and described in greater detail in the following description.

Identical components in the various figures have always been provided with the same reference numerals and are therefore usually also referred to or mentioned only once.

DETAILED DESCRIPTION

Figure 1:
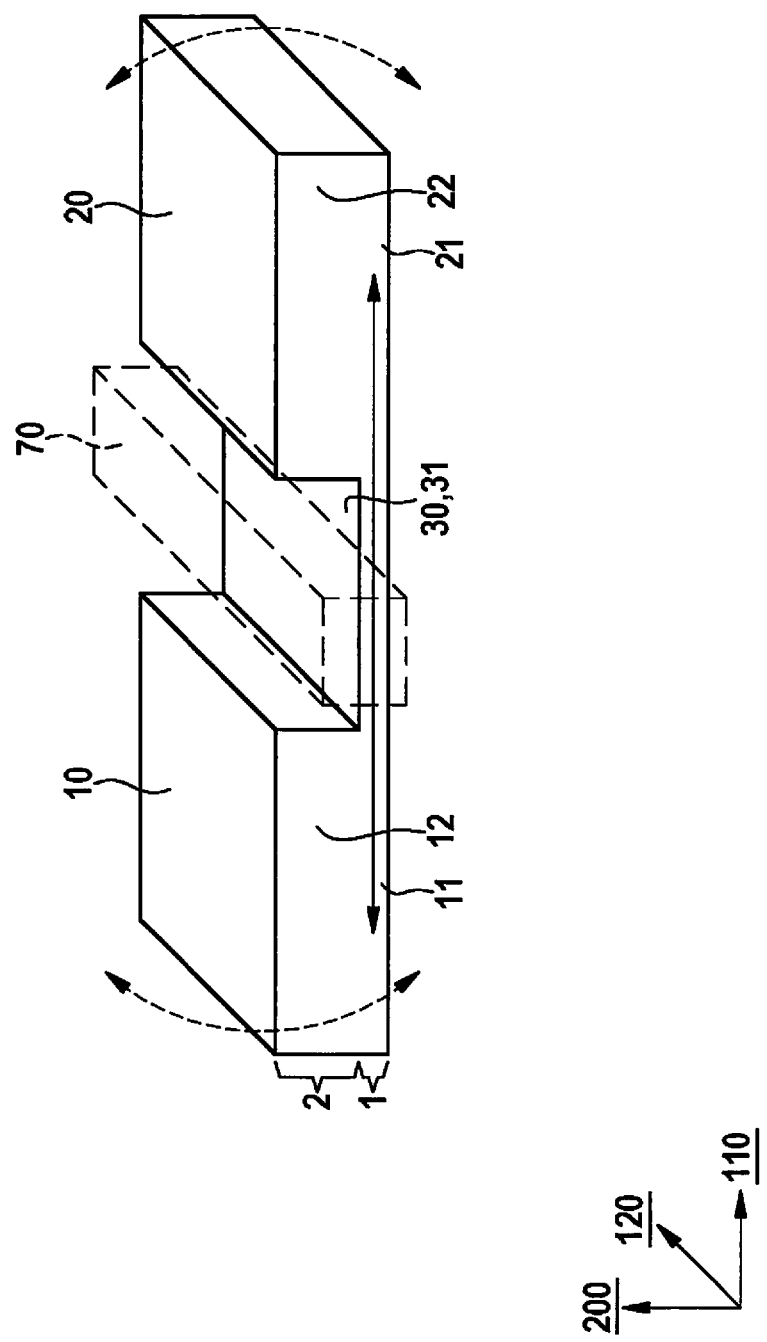
FIG. 1 shows schematically a portion of a rotation-rate sensor according to a first exemplary embodiment of the present invention.

FIG. 1 schematically shows a portion of a rotation-rate sensor according to one embodiment of the present invention. Shown are a first mass element 10 and a second mass element 20. The two mass elements 10, 20 are partially configured in a first function layer 1 and a second function layer 2. In particular, a first mass region 11 and a further first mass region 21 are situated in first function layer 1, and a second mass region 12 and a further second mass region 22 are situated in second function layer 2. Mass elements 10, 20 are coupled to each other by a coupling structure 30. Coupling structure 30 has a first coupling region 31, which is situated in first function layer 1. Coupling structure 30 is configured as a push rod and is stiff in a first and a second main extension direction 110, 120 of the substrate. For example, the illustrated embodiment allows for coupled movements of the two mass elements 10, 20 according to the drawn-in dashed arrows. A further, independent micromechanical element 70 may be placed above coupling structure 30, for instance. This is illustrated in FIG. 1 by the dashed body 70.

Figure 2:
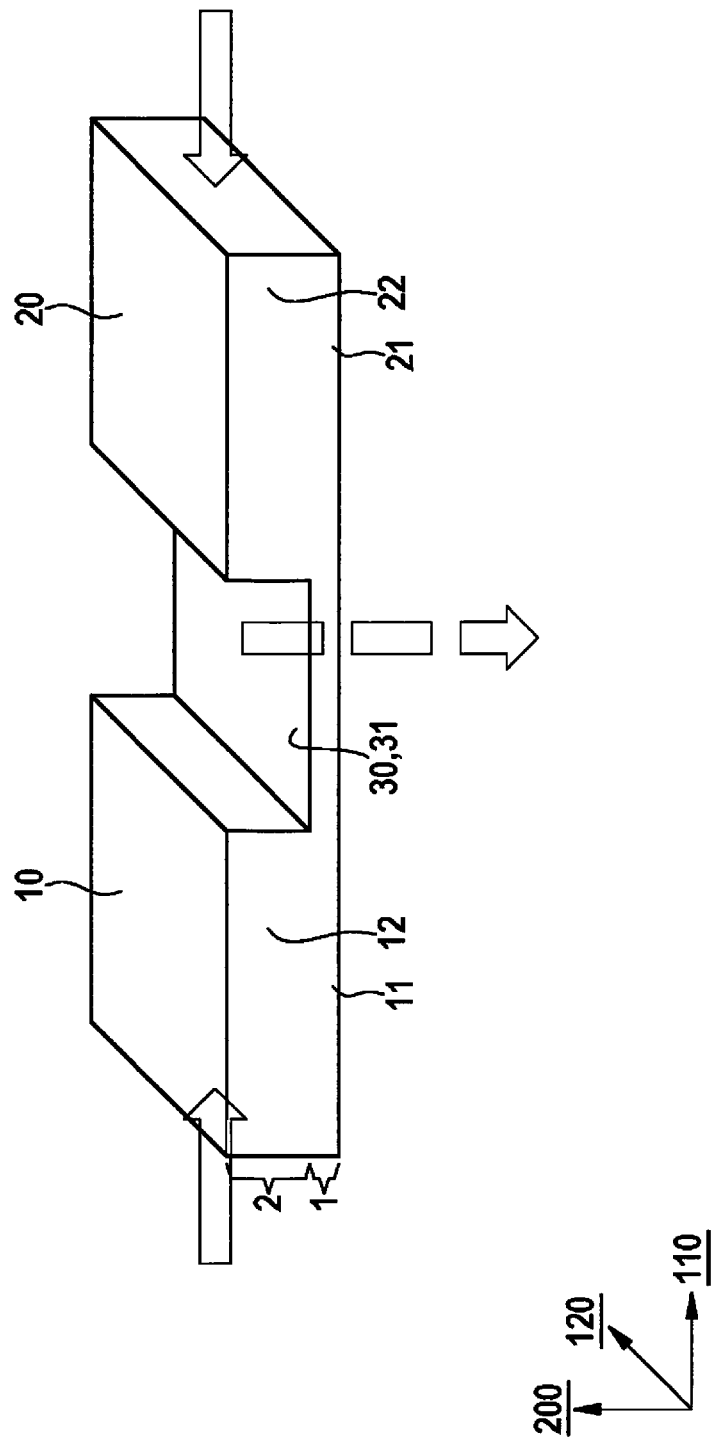
FIG. 2 shows schematically a portion of a rotation-rate sensor according to the first exemplary embodiment of the present invention.

FIG. 2 schematically shows a portion of the rotation-rate sensor according to the first exemplary embodiment of the present invention shown in FIG. 1. The drawn-in wide and uninterrupted arrows symbolize mechanical stress acting on first and second mass elements 10, 20 from the outside, this stress possibly being caused by temperature effects, for instance. Since first mass element 10 and second mass element 20 are asymmetrically coupled by coupling structure 30 in relation to extension direction 200, such an incoupling of stress leads to an evasive movement of coupling structure 30 or the entire illustrated assembly in the direction of the wide, dashed arrow (i.e. in negative extension direction 200).

Figure 3:
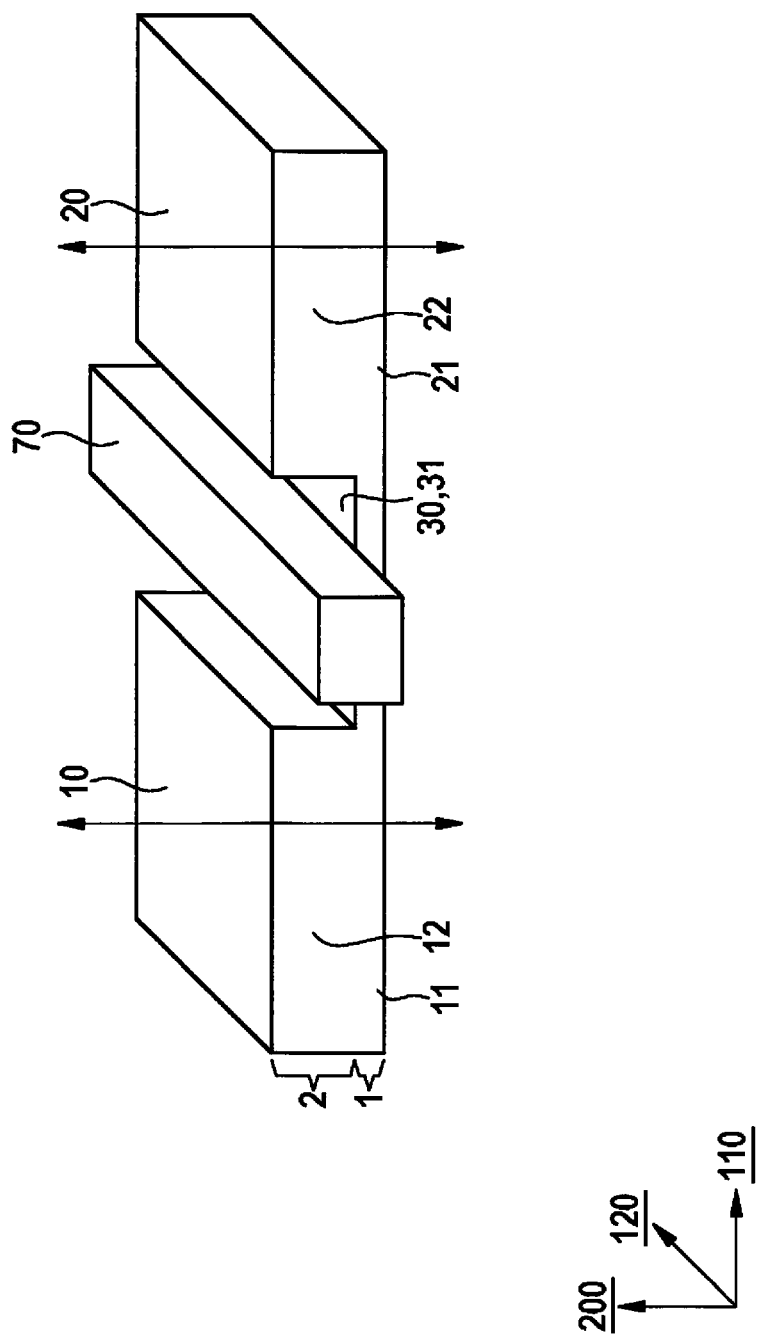
FIG. 3 shows schematically a portion of a rotation-rate sensor according to the first exemplary embodiment of the present invention.

FIG. 3 schematically shows a portion of the rotation-rate sensor according to the first exemplary embodiment of the present invention illustrated in FIG. 1. The stiffness of coupling structure 30 in an extension direction 200 perpendicular to main extension plane 110, 120 of the substrate is essentially defined, among other things, by the thickness (in extension direction 200) of coupling structure 30, and thus by the relationship of the thicknesses of the first and second function layers 1, 2. Given suitable dimensions of the structure elements, sufficiently stiff connections/coupling structures 30 in first and second main extension directions 110, 120 are able to be realized in this way, e.g., even if an independent micromechanical element 70 is crossed. For example, the illustrated embodiment allows for coupled movements of the two mass elements 10, 20 in extension direction 200 according to the drawn-in arrows, the masses being able to move both opposite in phase and in phase.

Figure 4:
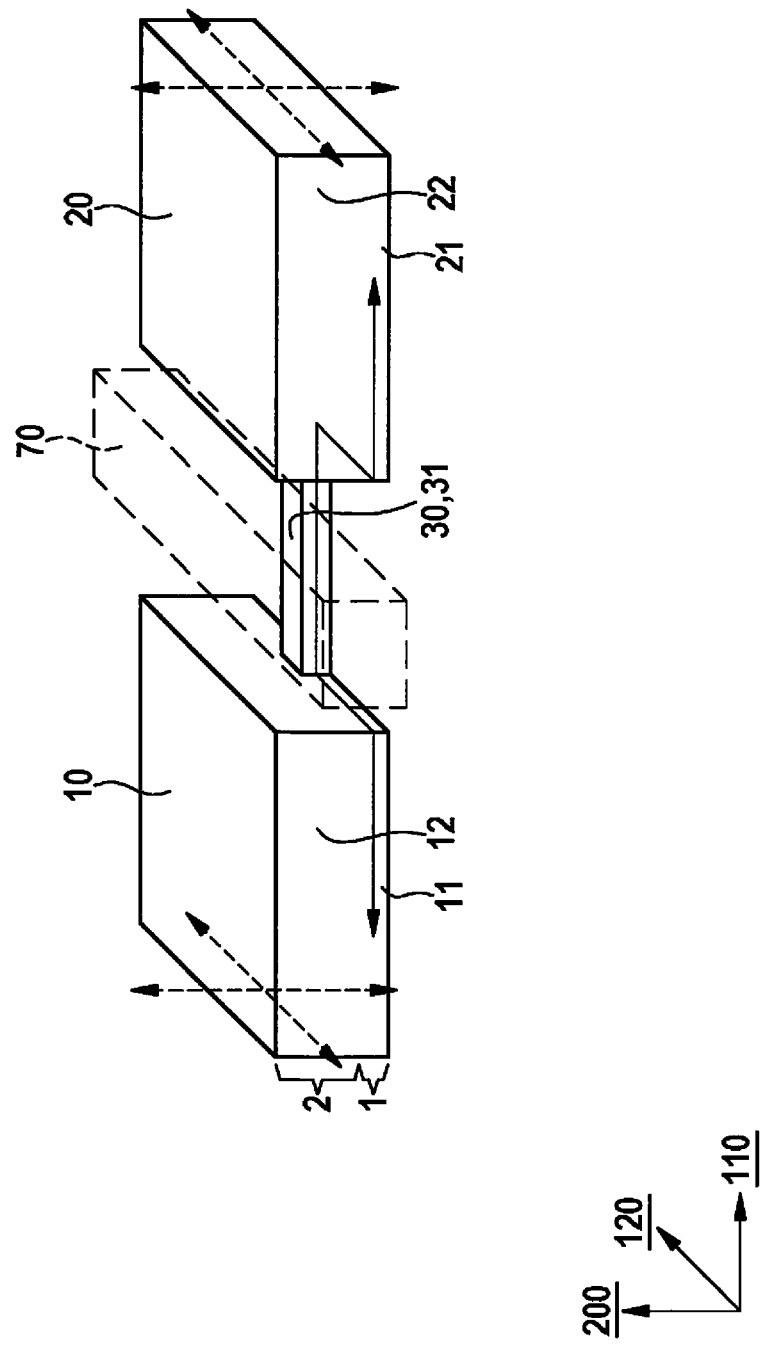
FIG. 4 shows schematically a portion of a rotation-rate sensor according to a second exemplary embodiment of the present invention.

FIG. 4 schematically shows a portion of the rotation-rate sensor according to a second exemplary second embodiment of the present invention. Shown are a first mass element 10 and a second mass element 20. The two mass elements are each partially configured in a first function layer 1 and in a second function layer 2. In particular, a first mass region 11 and a further first mass region 21 are situated in first function layer 1, and a second mass region 12 and a further second mass region 22 are situated in second function layer 2. Mass elements 10, 20 are coupled to each other with the aid of a coupling structure 30. The coupling structure has a first coupling region 31, which is situated in first function layer 1. Coupling structure 31 is configured as a thin push rod and is stiff in a first main extension direction 110 of the substrate. For example, the illustrated embodiment allows for coupled movements of the two mass elements 10, 20 according to the drawn-in dashed arrows, i.e. in particular in a second main extension direction 120 of the substrate and in extension direction 200, which extends perpendicular to main extension plane 110, 120 of the substrate. A further independent micromechanical element 70 is able to be placed above coupling structure 30, for instance. This is illustrated by dashed body 70 in FIG. 4.

Figure 5:
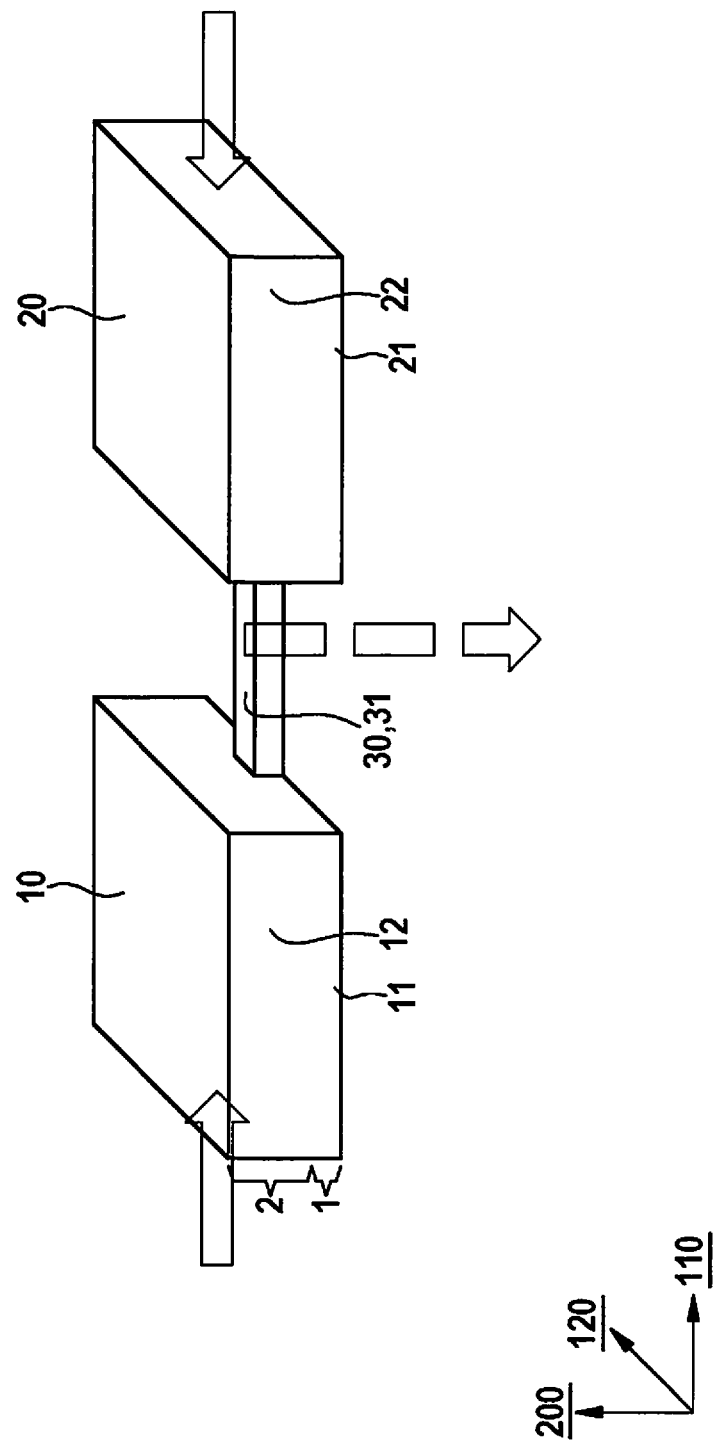
FIG. 5 shows schematically a portion of a rotation-rate sensor according to the second exemplary embodiment of the present invention.

FIG. 5 schematically illustrates a portion of the rotation-rate sensor according to the second exemplary embodiment of the present invention shown in FIG. 4. The drawn-in wide continuous arrows symbolize mechanical stress acting on first and second mass elements 10, 20 from the outside, which could be caused by temperature effects, for instance. Since coupling structure 30 couples first mass element 10 and second mass element 20 in an asymmetrical manner in relation to extension direction 200, such an incoupling of stress leads to an evasive movement of coupling structure 30, or of the entire illustrated assembly, in the direction of the wide dashed arrow (i.e. in negative extension direction 200).

Figure 6:
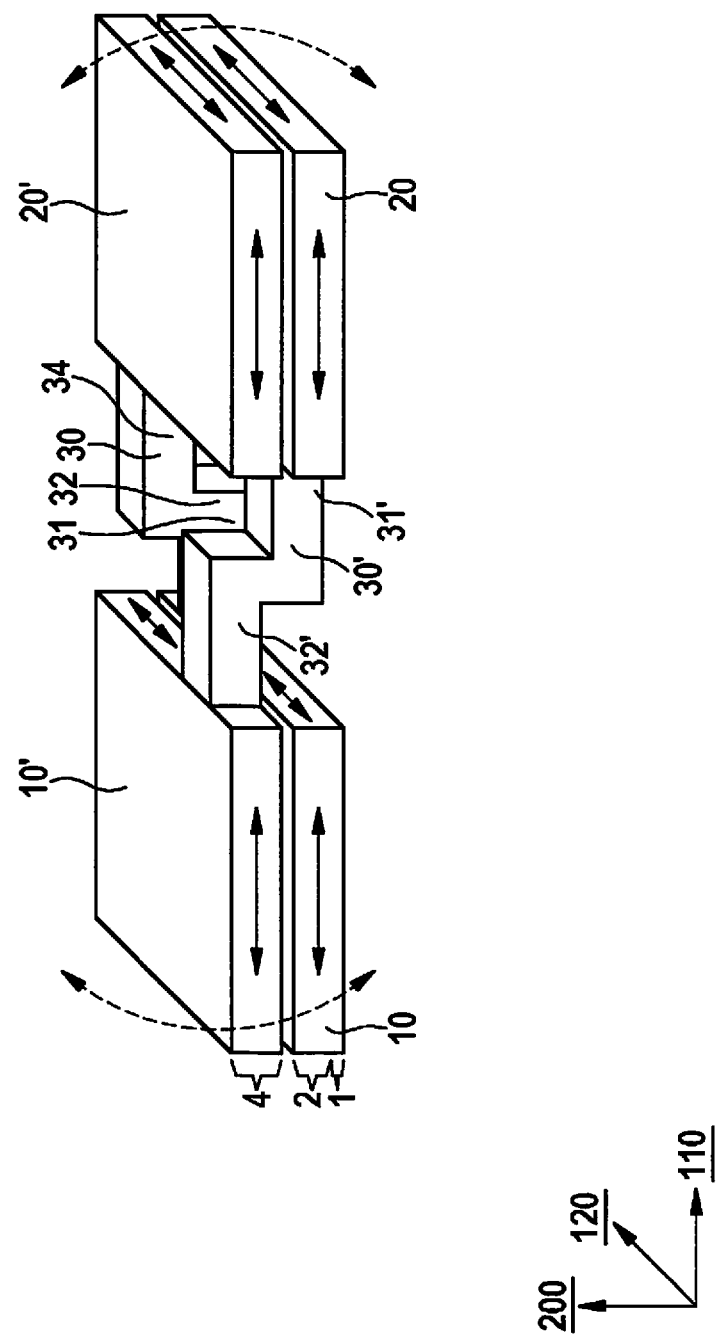
FIG. 6 shows schematically a portion of a rotation-rate sensor according to a third exemplary embodiment of the present invention.

FIG. 6 schematically illustrates a portion of a rotation-rate sensor according to a third exemplary embodiment of the present invention. Shown are a first mass element 10, a second mass element 20, a further first mass element 10' and a further second mass element 20'. First and second mass elements 10, 20 are configured in a first and second function layer 1, 2. Further first and further second mass elements 10', 20' are configured in a fourth function layer 4. Fourth function layer 4 is situated above second function layer 2. In addition, a coupling structure 30 is shown. Coupling structure 30 includes a first coupling region 31, which is configured in first function layer 1, a second coupling region 32, which is configured in second function layer 2, and a further coupling region 34, which is configured in fourth function layer 4. The coupling structure mechanically connects first mass element 10 to the further second mass element 20'. Moreover, an additional coupling structure 30'. Additional coupling structure 30' is partially situated in first main extension direction 110 between first and second mass elements 10, 20. It includes an additional coupling region 31' and an additional further coupling region 32'. Additional coupling region 31' is situated in first and second function layers 1, 2. Additional further coupling region 32' is configured in fourth function layer 4. Because of additional coupling structure 30', second mass element 20 and further first mass element 10' are mechanically connected and coupled to each other. The illustrated embodiment allows for parallel movements of the respectively coupled mass elements 10, 20', 10', 20 in main extension plane 110, 120, while anti-parallel movements are suppressed. Depending on the thickness ratio of first and second function layers 1, 2 to fourth function layer 4, in particular bending movements in extension direction 200 are possible or are otherwise suppressed, e.g., for thick function layers 1, 2, 4. With the aid of the illustrated embodiment, it is possible, for example, to realize mass elements that are situated on top of one another (in extension direction 200) and which are able to oscillate against one another in first or second main extension direction 110, 120. Possible oscillation directions of individual mass elements 10, 10', 20, 20' are illustrated by the thick and dashed arrows.

Figure 7:
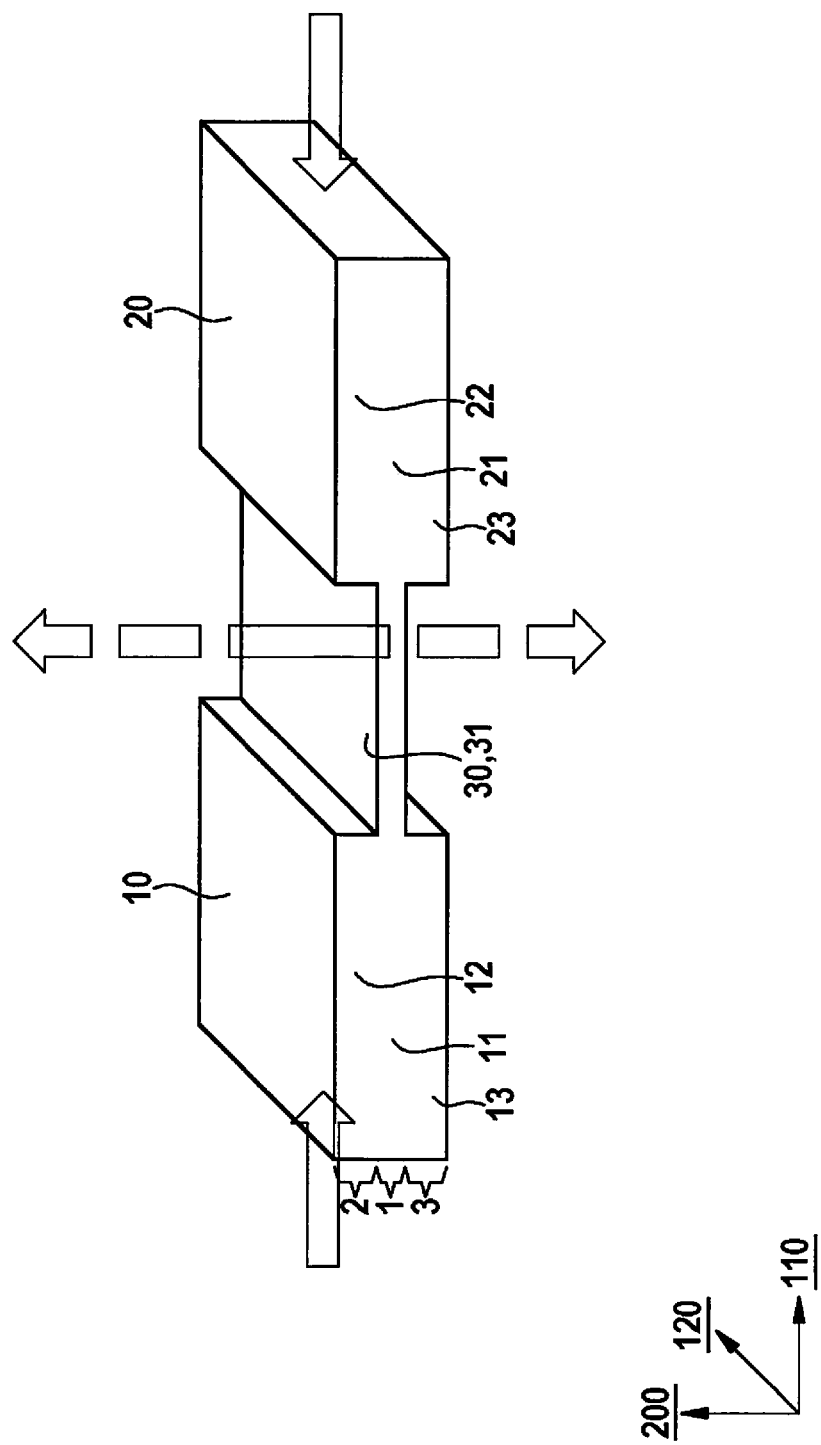
FIG. 7 shows schematically a portion of a rotation-rate sensor according to a fourth exemplary embodiment of the present invention.

FIG. 7 schematically illustrates a portion of a rotation-rate sensor according to a fourth exemplary embodiment of the present invention. The illustrated embodiment includes the components already shown in FIG. 1. In addition, a third function layer 3 is shown, which is situated between the substrate and first function layer 1. First mass element 10 includes a third mass region 13, which is configured in third function layer 3. Second mass element 20 includes a further third mass region 23, which is also configured in third function layer 3. This makes it possible to position a coupling structure 10, which connects first and second mass elements 10, 20, on first and second mass element 10, 20 in a centered manner (both in relation to first and second main extension directions 110, 120 and to extension direction 200 perpendicular thereto). The drawn-in wide continuous arrows symbolize stress that is acting on first and second mass elements 10, 20 from the outside. Since coupling structure 30 couples first mass element 10 and second mass element 20 in a symmetrical manner in relation to extension direction 200, no compensatory movement of coupling structure 30 or the entire illustrated assembly (broad dashed arrows) advantageously takes place even under such an incoupling of stress.

Figure 8:
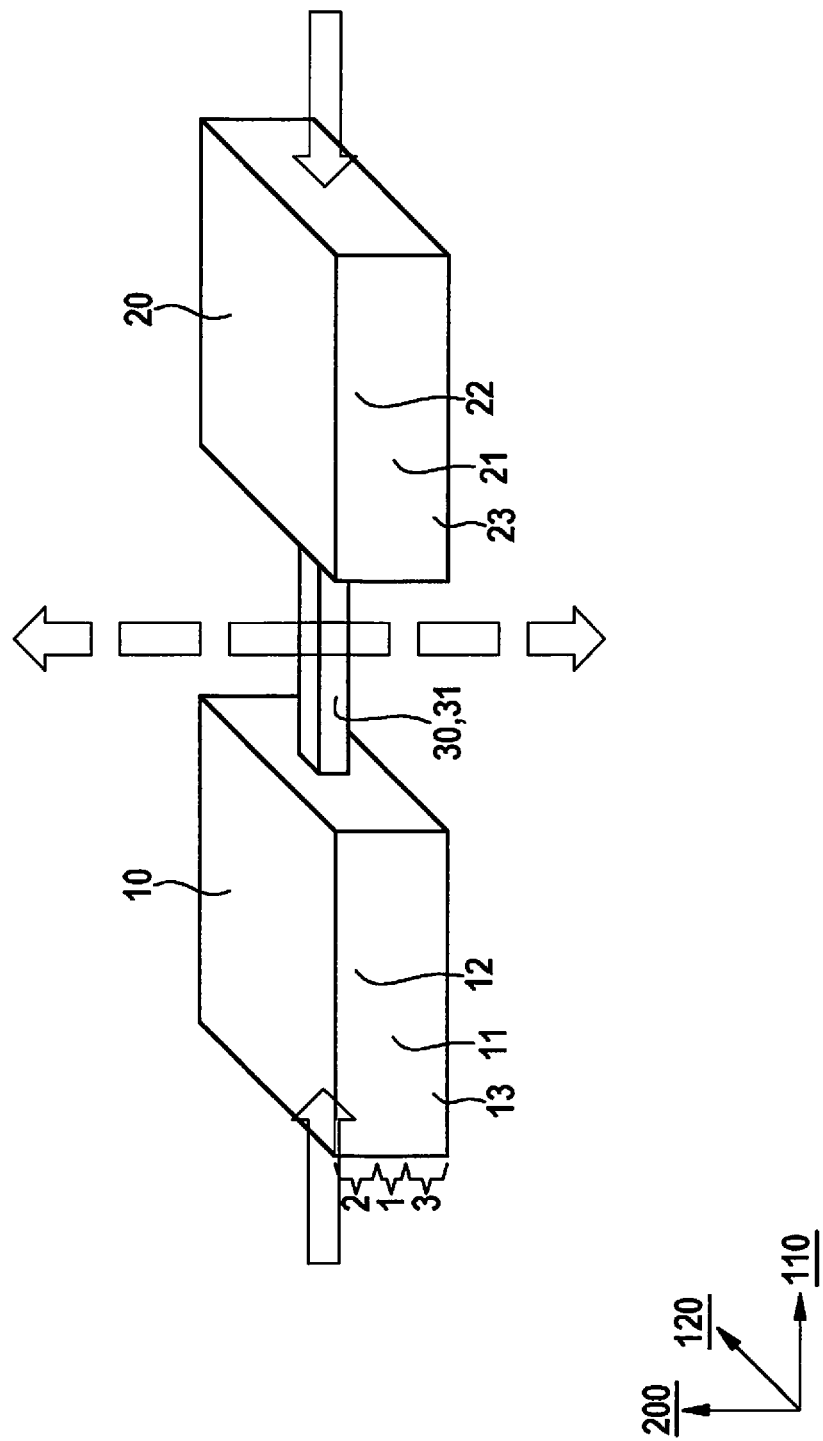
FIG. 8 shows schematically a portion of a rotation-rate sensor according to a fifth exemplary embodiment of the present invention.

FIG. 8 schematically shows a portion of a rotation-rate sensor according to a fifth embodiment of the present invention. The fifth exemplary embodiment is similar to the fourth exemplary embodiment (FIG. 7) with the difference that coupling structure 30 has a clearly greater extension in first main extension direction 110 than in second main extension direction 120. This makes it possible to couple two mass elements 10, 20 with each other so that they are able to execute a relative movement in extension direction 200 and second main extension direction 120, but no compensatory movement in extension direction 200 takes place (thick dashed arrows) in response to an incoupling of stress from the outside.

Figure 9:
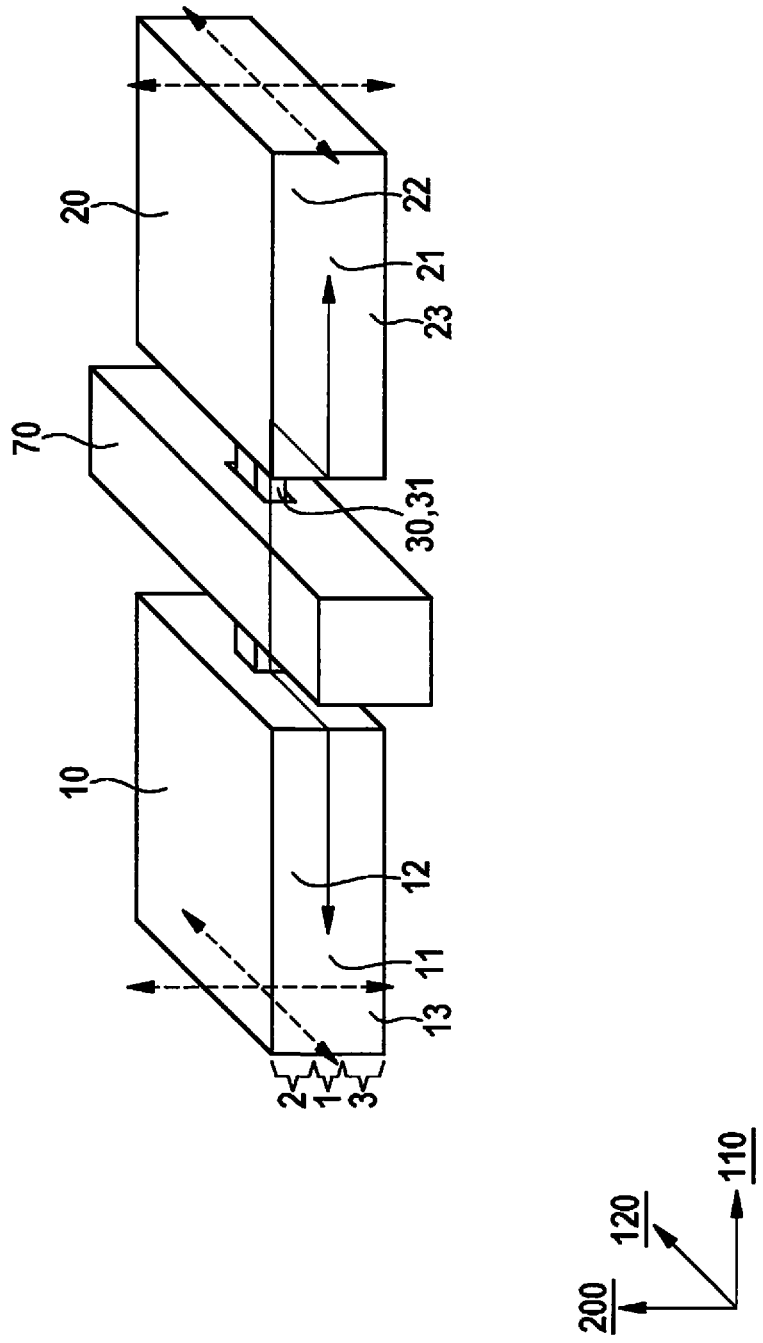
FIG. 9 shows schematically a portion of a rotation-rate sensor according to a sixth exemplary embodiment of the present invention.

FIG. 9 schematically shows a portion of a rotation-rate sensor according to a sixth exemplary embodiment of the present invention. The sixth exemplary embodiment is similar to the fifth exemplary embodiment (FIG. 8). In addition, a further independent micromechanical element 70 is shown, which partially surrounds coupling structure 30. Moreover, the dashed arrows symbolize the movements of first and second mass elements 10, 30 that are possible in extension direction 200 and second main extension direction 120 in this particular embodiment.

Figure 10:
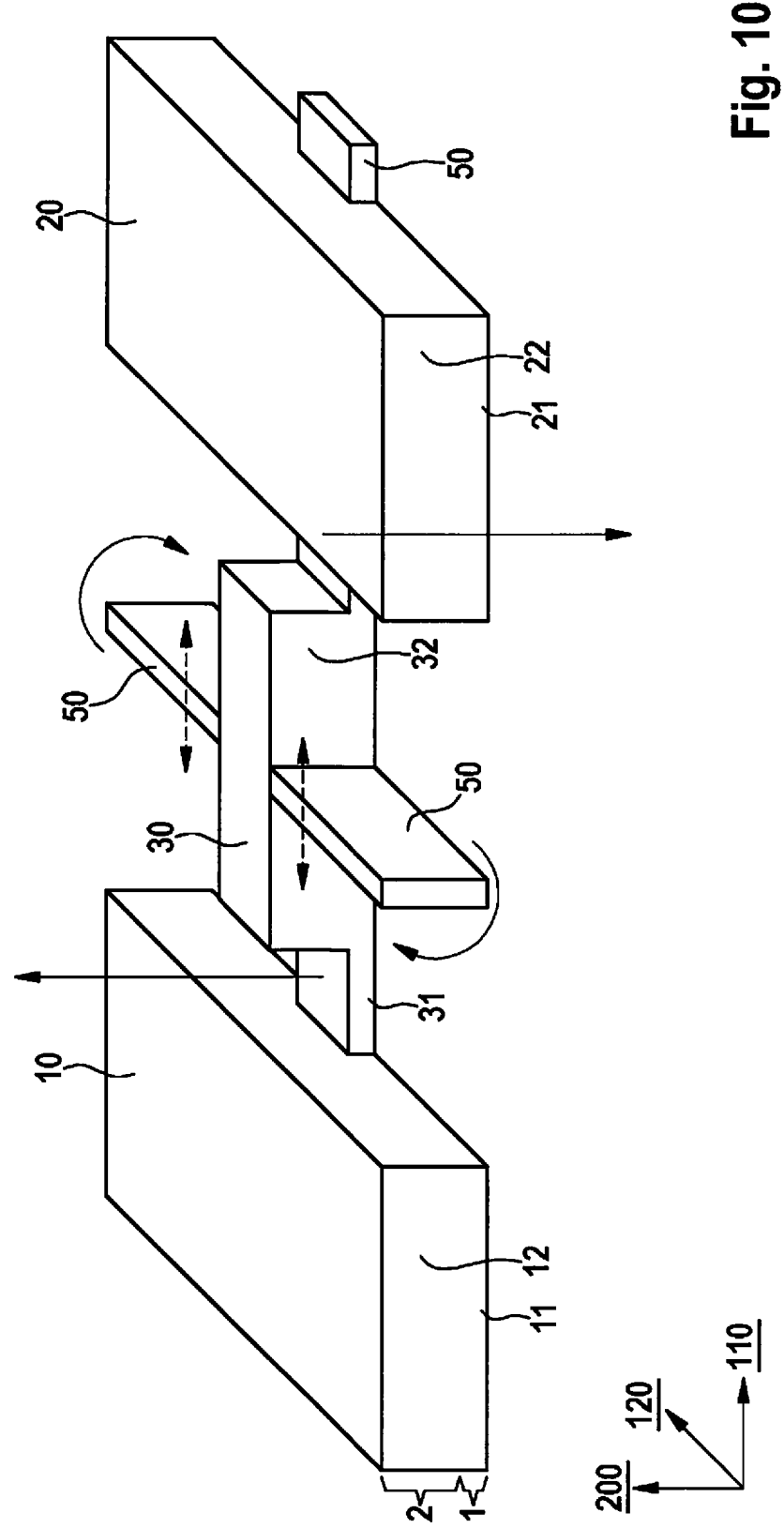
FIG. 10 shows schematically a portion of a rotation-rate sensor according to a seventh exemplary embodiment of the present invention.

FIG. 10 schematically shows a portion of a rotation-rate sensor according to a seventh exemplary embodiment of the present invention. A first and a second mass element 10, 20 are mechanically coupled with the aid of a coupling structure 30. The two mass elements 10, 20 are each partially configured in a first function layer 1 and a second function layer 2, and a first mass region 11 and a further first mass region 21 are situated in first function layer 1 and a second mass region 12 and a further second mass region 22 are situated in second function layer 2. Coupling structure 30 includes a first coupling region 31, which is configured in first function layer 1, and a second coupling region 32, which is configured in second function layer 2. The first and second coupling regions 31, 32 have a greater extension in first main extension direction 110 than in second main extension direction 120. In particular, only first coupling region 31, but not second coupling region 32, directly abuts mass elements 10, 20. As a consequence (and because of the small extension of first coupling region 31 in extension direction 200), oscillations of mass elements 10, 20 are possible in extension direction 200 (illustrated by broad arrows that point in positive and negative extension direction 200). In addition, coupling structure 30 includes two anchoring points 50 with the aid of which coupling structure 30 is able to be coupled to the substrate. The main extension direction of anchoring points 50 coincides with second main extension direction 120 of the substrate. Anchoring points 50 are configured in first and second function layers 1, 2. Moreover, anchoring points 50 are centrically situated (in relation to first main extension direction 110) between the first and second mass element and thus also centrically situated on first and second coupling regions 31, 32, which results in the form of a torsion bar. In this way, the illustrated assembly is configured as a rocker structure having a hinge (which allows movements along the drawn-in curved broad arrows). In the illustrated embodiment, movements in first main extension direction 110 are only partially suppressed because anchoring points 50 have only a small extension in this direction 110 and thus relatively low stiffness. This is illustrated by the dashed arrows.

Figure 11:
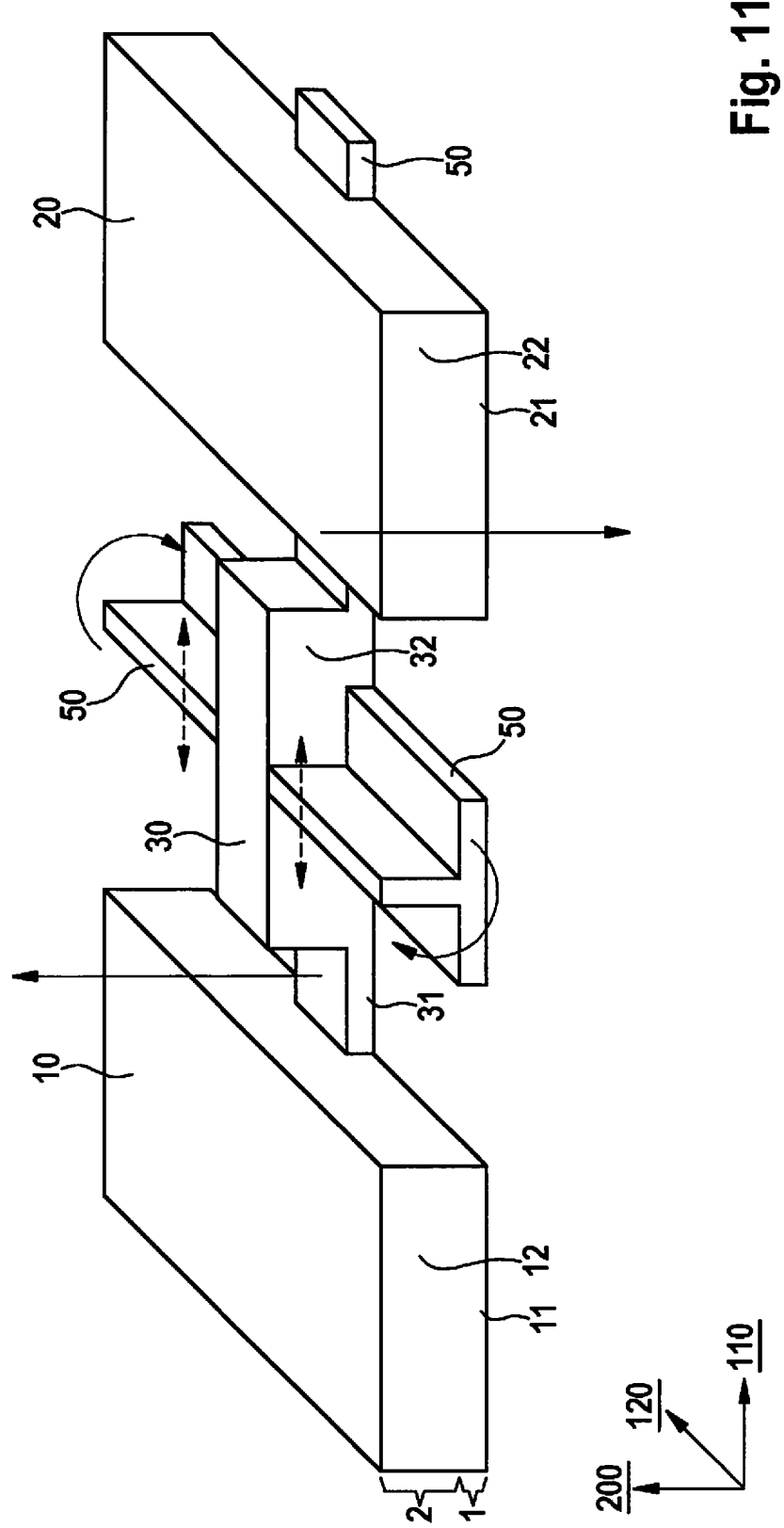
FIG. 11 shows schematically a portion of a rotation-rate sensor according to an eighth exemplary embodiment of the present invention.

FIG. 11 schematically shows a portion of a rotation-rate sensor according to an eighth exemplary embodiment of the present invention. The eighth exemplary embodiment is similar to the seventh exemplary embodiment (FIG. 10). However, anchoring points 50, which are configured as part of coupling structure 30, have a T-shaped cross-sectional surface in this embodiment. This is possible in particular because anchoring points 50 have a first anchoring region in first function layer 1 that is broadened in first main extension direction 110 (this first anchoring region being broader in first main extension direction 110 than a second anchoring region of anchoring points 50 situated in second function layer 2). As a result, coupling structure 30 in the eighth exemplary embodiment is stiffer in first main extension direction 110 than in the seventh exemplary embodiment (FIG. 10), and oscillations in first main extension direction 110 are suppressed. The suspension of the rocker by a torsion bar having a T-profile is resistant to bending, in particular in first main extension direction 110 and extension direction 200 (in relation to the torsional stiffness).

Figure 12:
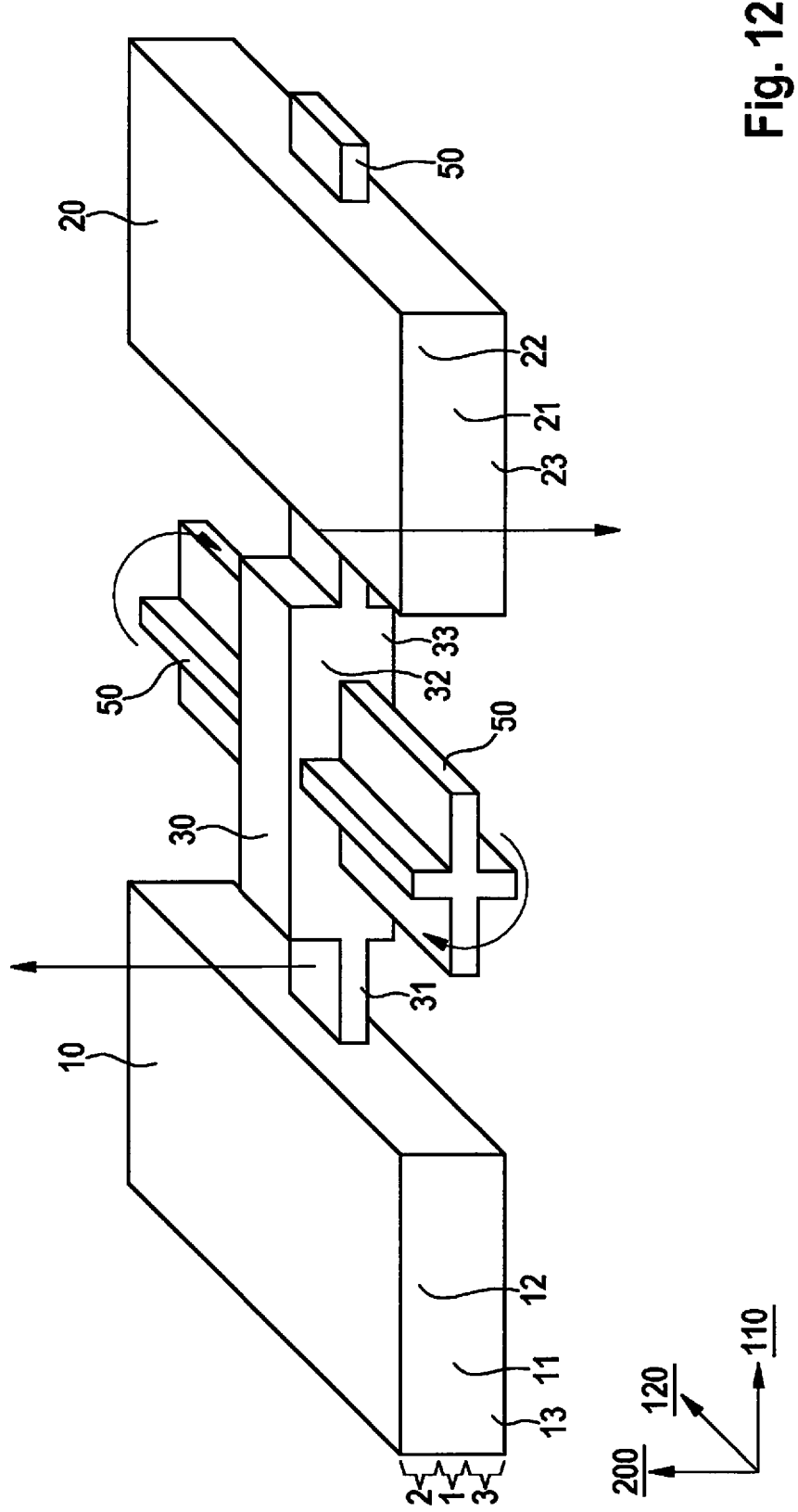
FIG. 12 shows schematically a portion of a rotation-rate sensor according to a ninth exemplary embodiment of the present invention.

FIG. 12 schematically illustrates a portion of a rotation-rate sensor according to a ninth exemplary embodiment of the present invention. The illustrated ninth exemplary embodiment is similar to the eighth exemplary embodiment illustrated in FIG. 11. In the ninth exemplary embodiment, however, a third function layer 3 is provided. Both a third mass region 13 of first mass element 10, a further third mass region 23 of second mass element 20 as well as a third coupling region 33 of coupling structure 30 are situated in this third function layer 3. In addition, anchoring points 50 have a third anchoring region in each case, which is configured in third function layer 3. This particularly results in a cross-shaped cross-section of anchoring points 50. The entire illustrated assembly is configured in mirror symmetry with respect to a symmetry plane that is situated parallel to main extension plane 110, 120 of the substrate and extends through mass elements 10, 20 and coupling structure 30 in a centered manner.

Figure 13:
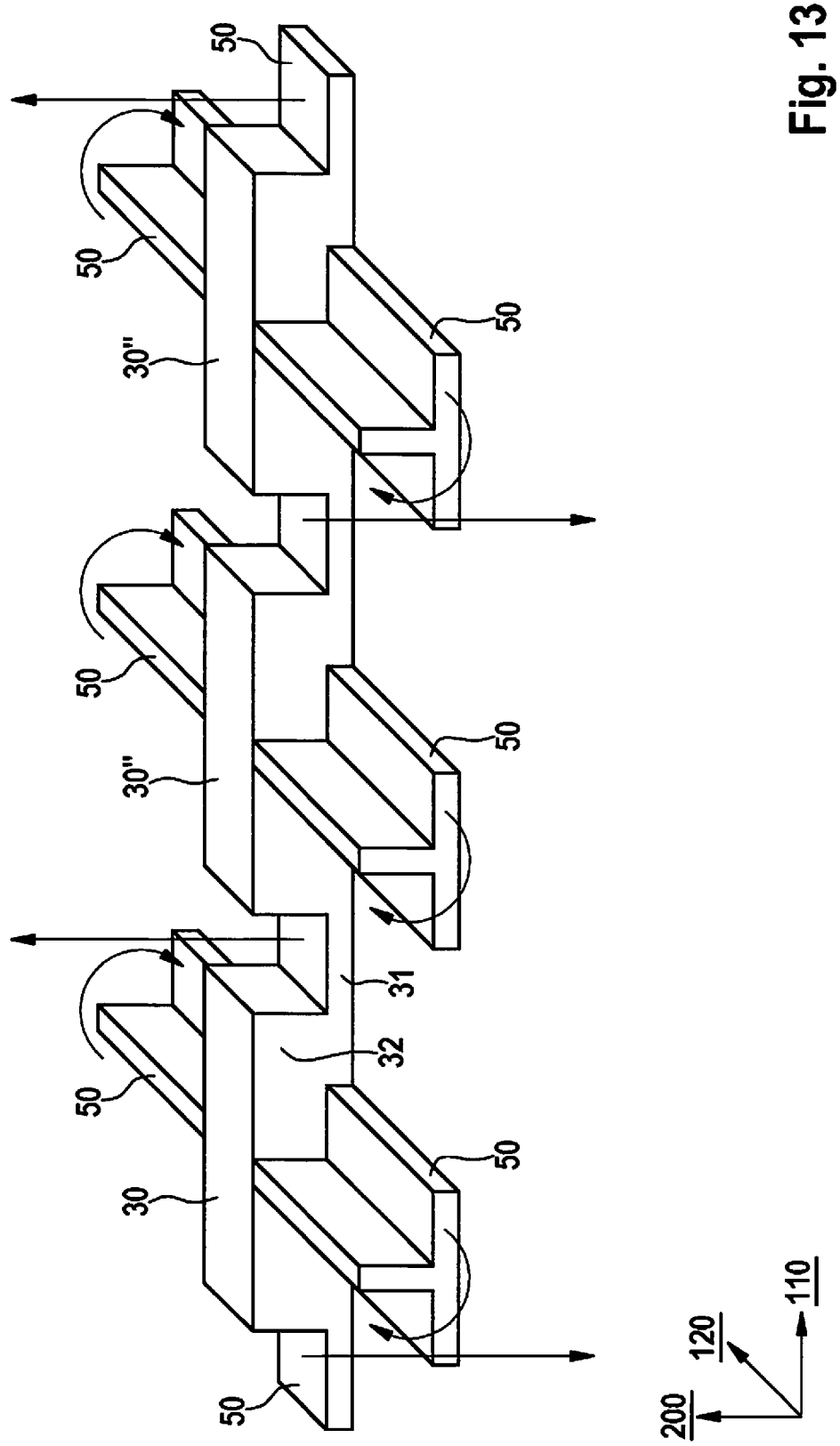
FIG. 13 shows schematically a portion of a rotation-rate sensor according to a tenth exemplary embodiment of the present invention.

FIG. 13 schematically illustrates a portion of a rotation-rate sensor according to a tenth exemplary embodiment of the present invention. Shown in particular are a coupling structure 30 and two further coupling structures 30". The (further) coupling structures 30, 30" are situated next to one another in first main extension direction 110 and directly abut one another. Coupling structures 30, 30" jointly result in a mechanical connection between two mass elements, which are not shown. Coupling structure 30 includes a first coupling region 31, situated in a first function layer 1, and a second coupling region 32, situated in a second function layer 2. In addition, coupling structure 30 includes two anchoring points 50 on the substrate, which mainly extend in second main extension direction 120. Anchoring points 50 are also partially configured in first and second function layers 1, 2 and have a T-shaped cross-section. Further coupling structures 30" are essentially similar to coupling structure 30. The illustrated (further) coupling structures 30, 30" allow for local movements that are illustrated by the uninterrupted arrows. Because of the hinged springs, an assembly of coupling structures 30, 30" results that exclusively supports movements in extension direction 200. Adjacent connection nodes between coupling structures 30, 30" move in phase opposition (symbolized by the uninterrupted arrows in positive and negative extension direction 200).

What is claimed is:

1. A rotation-rate sensor, comprising:
   a substrate, the substrate having a main extension plane; and
   at least one first and one second mass element which are oscillate-able, a first main extension direction of the substrate pointing from the first mass element to the second mass element, and a coupling structure being situated in the first main extension direction between the first and second mass elements;
   wherein a first coupling region of the coupling structure is situated in a first function layer and a first mass region of the first mass element is situated in the first function layer, and a second mass region of the first mass element is situated in a second function layer and a second coupling region of the coupling structure is situated in the second function layer, the first function layer being situated in an extension direction perpendicular to the main extension plane between the substrate and the second function layer, and a second main extension direction being situated perpendicular to the first main extension direction, the first coupling region having a greater extension in the first main extension direction than in the second main extension direction, wherein only the first coupling region but not the second coupling region directly abuts the at least one first and one second mass element wherein the abutting occurs in the first main extension direction.

2. The rotation-rate sensor of claim 1, wherein the first and second mass elements are mechanically connected with the coupling structure.

3. The rotation-rate sensor of claim 1, wherein the first function layer has a smaller extension than the second function layer in the extension direction perpendicular to the main extension plane.

4. The rotation-rate sensor of claim 1, wherein the first coupling region has greater stiffness in the first main extension direction than in the second main extension direction.

5. The rotation-rate sensor of claim 1, wherein a third function layer is situated in an extension direction between the substrate and the first function layer, and a third mass region of the first mass element is situated in the third function layer.

6. The rotation-rate sensor of claim 5, wherein a further first mass region of the second mass element is situated in the first function layer, and a further second mass region of the second mass element is situated in the second function layer, and a further third mass region of the second mass element is situated in the third function layer.

7. The rotation-rate sensor of claim 5, wherein a third coupling region of the coupling structure is situated in the third function layer.

8. The rotation-rate sensor of claim 7, wherein the second main extension direction runs perpendicular to the first main extension direction, and the second coupling region has a smaller extension in the second main extension direction than the first coupling region, and in particular the third coupling region has a smaller extension in the second main extension direction than the first coupling region.

9. The rotation-rate sensor of claim 5, wherein a fourth function layer is situated in an extension direction above the second function layer, and a further second mass element is situated in the fourth function layer, the coupling structure having a second coupling region situated in the second function layer and a further coupling region, the further coupling region being situated in the fourth function layer, and the first mass element and the further second mass element are mechanically connected to each other with the aid of the coupling structure.

10. The rotation-rate sensor of claim 9, wherein a further first mass element is situated in the fourth function layer, and an additional coupling structure is situated in the first main extension direction between the first and second mass elements, the additional coupling structure having an additional coupling region and an additional further coupling region, the additional coupling region being configured in the first and second function layers, and the additional further coupling region being configured in the fourth function layer, and the second mass element and the further first mass element are mechanically connected to each other with the aid of the additional coupling structure.

11. The rotation-rate sensor of claim 1, wherein the coupling structure has at least one anchoring point on the substrate so that the coupling structure includes a hinged element.

12. The rotation-rate sensor of claim 1, wherein the coupling structure is configured as a rocker structure.

13. The rotation-rate sensor of claim 1, wherein the rotation-rate sensor has at least one further coupling structure, and the further coupling structure has an essentially identical structure as the coupling structure, the coupling structure and the further coupling structure being situated next to each other in the first main extension direction of the substrate.

14. A method for producing a rotation-rate sensor, the method comprising:
   providing a substrate, the substrate having a main extension plane; and
   providing at least one first and one second mass element which are oscillate-able, a first main extension direction of the substrate pointing from the first mass element to the second mass element, and a coupling structure being situated in the first main extension direction between the first and second mass element;
   wherein a first coupling region of the coupling structure is situated in a first function layer and a first mass region of the first mass element is situated in the first function layer, and a second mass region of the first mass element is situated in a second function layer and a second coupling region of the coupling structure is situated in the second function layer, the first function layer being situated in an extension direction perpendicular to the main extension plane between the substrate and the second function layer, and a second main extension direction being situated perpendicular to the first main extension direction, the first coupling region having a greater extension in the first main extension direction than in the second main extension direction, wherein only the first coupling region but not the second coupling region directly abuts the at least one first and one second mass element, wherein the abutting occurs in the first main extension direction.

* * * * *